Patented Nov. 8, 1927.

1,648,866

UNITED STATES PATENT OFFICE.

GEORGE I. RAY, OF CHARLOTTE, NORTH CAROLINA, ASSIGNOR TO RADIATOR SPECIALTY COMPANY, OF CHARLOTTE, NORTH CAROLINA, A CORPORATION OF NORTH CAROLINA.

LEAK-STOPPING COMPOSITION FOR HOT-WATER SYSTEMS.

No Drawing.   Application filed April 12, 1927.   Serial No. 183,240.

My invention relates to a composition for stopping leaks in hot water circulating systems. I am aware that heretofore various mixtures have been used for stopping leaks in hot water circulating systems, but in many of these compositions there are certain ingredients which are injurious to the interior walls of the system. Many compositions of this nature will stop the leak for a limited period of time, but will not seal the leak permanently. Other compositions which are more or less efficient as leak stopping agents, tend to coat the interior of the system with matter which prevents the free radiation of heat from the system, which is very detrimental in automobile radiators and the like, where it is important that radiation be maintained. Other leak stopping compounds have a tendency to clog portions of the system, which is not to be desired. It is an object of this invention to produce a leak stopping compound which will permanently stop the leak and also keep the interior of the system in good condition by preventing the clogging of the same and also by preventing a formation on the walls of the interior of the system to interfere with proper radiation.

I attain the above stated objects by placing in the hot water circulating system a mixture of aluminum, flax seed meal, silicate of soda and soap in about the following proportions:

|  | Per cent. |
|---|---|
| Aluminum | 15 |
| Flax seed meal | 60 |
| Silicate of soda | 10 |
| Soap | 15 |

I desire it to be understood that the above proportions may be varied considerably without greatly affecting the operation of the composition, and without departing from the spirit of the invention.

Although I desire it to be understood that I am not to be bound by the explanation of the reactions and actions of the ingredients of my composition in the explanation which will follow, I offer an explanation of what I think happens.

When the composition as above set forth is placed in a hot water circulating system partially filled with water, the silicate of soda dissolves and partly hydrolyzes giving small amounts of sodium hydroxide and hydrated colloidal silica. The soap goes into a colloidal solution and carries with it a large amount of both the flax seed meal and the aluminum. In other words, it acts as a powerful deflocculating agent. The colloidal hydrated silica also exerts a deflocculating effect, and the combined action of these colloidal substances eliminates any possibility of the particles of flax seed meal becoming caked in the lowermost portions of the hot water circulating system, such as in the bottom of an automobile radiator, or from becoming attached to the side walls of the system.

The alkali from the silicate of soda will slowly attack the aluminum, resulting in the formation of aluminum soap and aluminum silicate, which assists in cementing the metallic aluminum and particles of flax seed meal which find their way into the leaks in the hot water circulating system. The mucilage in the flax seed meal will have its usual action in cementing the plugging particles in the leak. In addition, the silicate of soda alone, when exposed to the air, dries and leaves a residue that has strong adhesive properties.

In regard to the deterging properties in this composition, the silicate of soda stimulates the soap and thus assists materially in the cleansing action of the preparation, which insures that the interior of the system will remain clean and unclogged at all times. The colloidal hydrated silica also possesses some deterging properties. The alkali from the silicate of soda prevents the oil in the flax seed meal from adhering to the inside of the system.

In case the soap is omitted from this mixture I find that still an efficient leak stopping composition is found. The particles of aluminum and flax are deflocculated by the hydrated colloidal silica, by the mucilage in the flax, and by the soap that results from the action of the alkali from the silicate and the oil from the flax seed meal. The plugging action is similar, but with a greater tendency to form aluminum silicate than to form aluminum soap, and the cleansing action would be quite efficient since the percentage of soap omitted would be supplied by additional silicate of soda.

In the specification I have set forth what

I think is the action of each element, and also the reactions of the various ingredients, and although specific terms are employed, they are used in a generic and descriptive sense, and not for purposes of limitation, the scope of the invention being co-extensive with the appended claims.

I claim:

1. A composition for stopping leaks in hot water circulating systems comprising a mixture of aluminum, flax seed meal, silicate of soda and soap.

2. A composition for stopping leaks in hot water circulating systems comprising a mixture of aluminum, flax seed meal and silicate of soda.

In testimony whereof I affix my signature.

GEORGE I. RAY.